United States Patent [19]

May

[11] Patent Number: 4,533,583

[45] Date of Patent: Aug. 6, 1985

[54] THERMAL INSULATING MAT

[76] Inventor: Michael G. May, Bel Air, CH 1180 Rolle, Switzerland

[21] Appl. No.: 591,236

[22] Filed: Mar. 19, 1984

Related U.S. Application Data

[63] Continuation of Ser. No. 380,854, May 21, 1982, abandoned.

[30] Foreign Application Priority Data

May 22, 1981 [DE] Fed. Rep. of Germany ....... 3120411

[51] Int. Cl.³ .............................................. B32B 3/04
[52] U.S. Cl. ....................................... 428/69; 428/72; 428/73; 428/76; 428/116; 428/178; 428/198; 428/920
[58] Field of Search ....................... 428/68, 69, 72, 73, 428/76, 116, 178, 198, 161, 920

[56] References Cited

U.S. PATENT DOCUMENTS

| 3,231,454 | 1/1966 | Williams | 428/166 |
| 3,294,387 | 12/1966 | Chavannes | 428/178 |
| 3,462,330 | 8/1969 | Greig et al. | 428/166 |
| 3,865,679 | 2/1975 | Hale | 428/178 |
| 4,287,250 | 9/1981 | Rudy | 428/178 |

*Primary Examiner*—James J. Bell
*Attorney, Agent, or Firm*—Edwin E. Greigg

[57] ABSTRACT

In order to fabricate and emplace a thermal insulating mat at favorable cost and in order to provide the mat with good thermal insulation properties at a favorable cost, the thermal insulating mat comprises films having sealed chambers which are filled with a filler gas, the thermal conduction coefficient of which is smaller than that of air.

10 Claims, 4 Drawing Figures

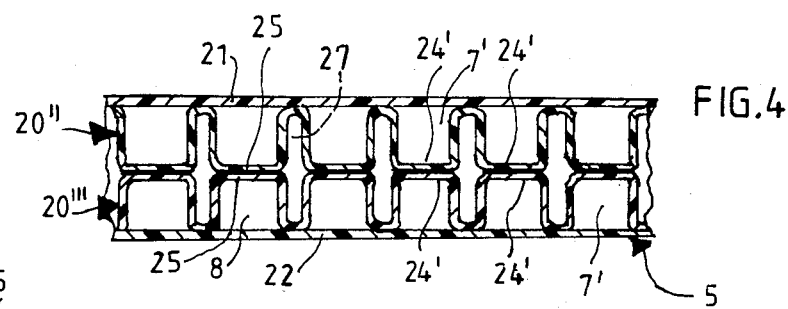
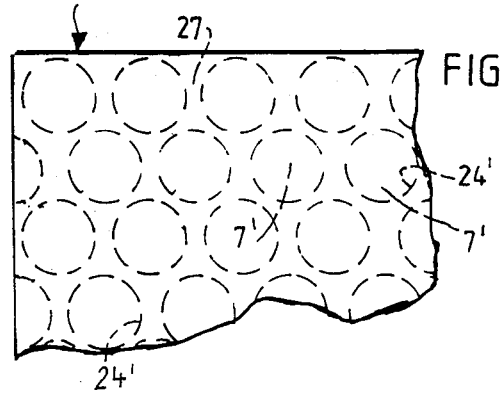
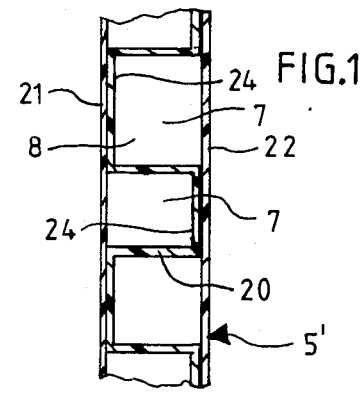
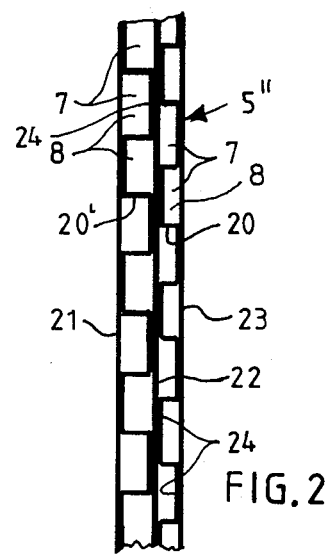

THERMAL INSULATING MAT

This is a continuation of copending application Ser. No. 380,854 filed May 21, 1982.

The invention relates to a thermal insulating mat.

Thermal insulating mats which are made of glass wool or mineral wool are known. However, they are relatively expensive, and putting them in place, which is relatively time consuming, requires special provisions. Their use is furthermore restricted to relatively few fields, and they are relatively high in specific weight compared to their surface area.

It is an object of the invention to create a thermal insulating mat which has good thermal insulating properties and a low specific weight compared to its surface area, which can be produced at favorable cost and can also be put into place in a simple manner at favorable cost and which, if desired, can also be embodied as highly transmissive to light.

This object is attained according to the invention by the thermal insulating mat disclosed herein.

Thermal insulating mats according to the invention may have various applications so as to effect good thermal insulation. For example, they can be used to improve thermal insulation of light-admitting openings, roofs, ceilings, walls or the like of buildings or the like. Since the thermal insulation mat according to the invention can without difficulty be made highly transmissive to light, it is also excellently well suited to improving the light-admitting openings of buildings, ships and the like when such openings do not require absolutely glass-clear transparency. Examples of such openings are the windows of factory buildings, indoor tennis courts or the like which are not used for viewing. Thermal insulation mats according to the invention can be inserted between two glass plates of one window, for example, as an intermediate layer to improve the thermal insulation; or such mats may be glued to an individual glass plate or im some similar manner improve the thermal insulation of light-admitting openings. Thermal insulation mats according to the invention can also act as the outer layers, inner layers or intermediate layers of roofs, ceilings and walls of buildings or the like. Thermal insulation mats according to the invention can also have numerous other fields of application, for example serving to provide the thermal insulation of containers, solar collectors or the like.

The flexible thermal insulating mat according to the invention is lightweight, has very good thermal insulating properties, can be put into place quickly and inexpensively and can be fabricated at a favorable cost. Since the filler gas has a lower thermal conduction coefficient than air, the thermal insulation effected is of particularly high quality. The filler gas can preferably be carbon dioxide ($CO_2$) or a mixture of carbon dioxide and another gas. Other suitable filler gases are also possible, preferably filler gases or filler gas mixtures which have a thermal conduction coefficient similar to that of carbon dioxide.

The films making up the thermal insulating mat according to the invention may preferably be gas-tight plastic films, and particularly advantageously heat-setting plastic films. The films may be single-layer or laminated films. Flexible films not of plastic or only partly of plastic are also possible, for instance laminated films having at least one layer which is not of plastic but is instead a metal reflective layer, for instance, for reflecting thermal radiation in order to increase the thermal insulation of a flexible thermal insulating mat according to the invention still further.

Preferably, a filler gas which is not a noble gas is used, in order to keep the price of the filler gas particularly low.

The pressure of the filler gas can be provided in some suitable manner. Preferably, the filler gas can be introduced at a pressure approximately corresponding to atmospheric pressure at sea level or at a pressure slightly above this.

In the drawing, exemplary embodiments of the invention are shown. Shown are:

FIG. 1 illustrates a detail of a cross section through a portion of a thermal insulating mat according to a first exemplary embodiment of the invention;

FIG. 2 illustrates a modification of the thermal insulating mat shown in FIG. 1 having a multiple-layered form of embodiment;

FIG. 3 illustrates a detail of a plan view on a thermal insulating mat according to a third exemplary embodiment of the invention;

FIG. 4 illustrates a detail of a cross section through a portion of a thermal insulating mat as shown in FIG. 3.

In FIG. 1, a thermal insulating mat 5' of flexible plastic films is shown schematically and as a detail of a cross section. A nubbed film 20, that is, a film having cup-like depressions 24 which in this exemplary embodiment are disposed adjacent one another without space between them, is covered on either side with respective flat films 21, 22 which are heat-sealed into place, in order to provide hermetic sealing of the depressions 24, which are directed in alternation in first one direction and then the other of the nubbed film 20. These films 20, 21 and 22 are made of gas-tight, heat-setting plastic. The films 21 and 22 extending over the cup-like depressions 24 thus create a multiplicity of hollow spaces or chambers 7 which are sealed off from the ouside in a gas-tight manner; the chambers 7 are filled with filler gas 8 the thermal coefficient of which is smaller than that of air and which may preferably comprise carbon dioxide and/or a mixture thereof. As a result, the thermal insulation properties of this mat 5' are particularly good. By means of the gas filling according to the invention, the conduction of heat occurring transversely to the plane of the mat 5' can be substantially cut in half, for example, as compared with a filling using air. The chambers 7 may be approximately cubic in shape, for instance, or may have some other suitable shape. They can preferably be relatively small. For example, the volume enclosed by an individual chamber 7 may be smaller than 1 $cm^3$.

FIG. 2, in schematic form, shows a cross section through a thermal insulating mat 5", which comprises a total of five layers of plastic film, firmly connected to one another by heat-sealing or the like. This mat has two inner layers 20, 20' of nubbed film, which lie flat, opposite one another with one-half of one chamber of one layer overlying one-half of its adjacent chamber in the other layer, with a flat film 22 placed between them and being permanently connected to them by heat-sealing. Sealed onto the outer sides of these nubbed films 20, 20' are flat plastic films 21, 23. The individual nubbed film 20, 20' may correspond to the nubbed film 20 shown in FIG. 1. The chambers 7 of this mat 5", which are formed by the depressions 24 of the nubbed films 20, 20' and the flat films 21, 22 and 23 and are sealed off from the outside in a gas-tight manner, are again filled with a filler gas 8, the thermal conduction coefficient of which is smaller than that of air.

The thermal insulating mat 5 shown in FIGS. 3 and 4 has two identically embodied nubbed films 20", 20''' disposed with one chamber directly above the other, each of which, in this exemplary embodiment, has cup-like depressions 24' directed toward one side of the nubbed film; these depressions 24' are disposed, per film, with a narrow spacing between them. These nubbed films 20", 20''' are connected to one another at the bottoms 25 of their depressions 24"; that is, the bottoms 25 of these depressions 24' of the two nubbed films 20", 20''' rest on one another and are permanently connected to one another there by heat-sealing. One flat film 21, 22 each is sealed onto the outer sides of each of the nubbed films 20", 20''', sealing off the depressions 24' of the nubbed films 20", 20''' in a gas-tight manner from chambers 7'. In this exemplary embodiment, the chambers 7' of the individual nubbed film 20", 20''' are spaced narrowly apart from one another laterally. These gas-tight sealed chambers 7' are likewise filled with filler gas 8, the thermal conduction coefficient of which is smaller than that of air, preferably with carbon dioxide and/or a mixture thereof. In case the mat 5 is also sealed off in a gas-tight manner on its narrow outer sides by means of plastic film or in some other manner, or if it has gas-tight compartments in its interior, then the remaining interior space 27 located between the chambers 7' may also be filled with filler gas, again having a thermal conduction coefficient smaller than that of air, preferablly with the same filler gas as that in the chambers 7'.

Since the thermal insulating mats 5, 5', 5" can also, among other uses, serve to improve the thermal insulation of light-admitting openings, it can preferably be provided that their plastic films are transparent.

The chambers 7' of the mat 5 may by way of example have diameters of 5 to 40 mm and heights of a few millimeters. However, other dimensions are also possible.

I claim:

1. A thermal insulating mat comprising a plurality of sealed chambers filled with a filler gas having a heat conductivity lower than air, said sealed chambers being formed by spaced flexible film with at least two layers of separate chambers formed by separate continuous flexible films disposed one over the other with said separate continuous films having portions thereof that extend parallel with said spaced film and adjacent portions that extend perpendicular to said spaced film with said parallel portions secured in a gas-tight manner to at least one of said spaced film thereby forming a plurality of separate chambers between said spaced parallel film.

2. A thermal insulating mat as defined by claim 1, characterized in that the filler gas at least partially comprises carbon dioxide ($CO_2$).

3. A thermal insulating mat as defined in claim 1, characterized in that the filler gas comprises a single gaseous substance.

4. A thermal insulating mat as defined by claim 1, characterized in that the filler gas is free of noble gas.

5. A thermal insulating mat as defined by claim 1, characterized in that said thermal insulating mat comprises translucent films having good light-transmissivity.

6. A thermal insulating mat as defined by claim 1, characterized in that the chambers of one layer are disposed beside one another with no space between them.

7. A thermal insulating mat as defined by claim 1, characterized in that the chambers of one layer are disposed spaced apart laterally from one another.

8. A thermal insulating mat as defined by claim 7, characterized in that the interstices between the chambers are likewise filled with filler gas, the thermal conduction coefficient of which is smaller than that of air and which filler gas preferably corresponds to the filler gas filling the chambers.

9. A thermal insulating mat as defined by claim 1, characterized in that said thermal insulating mat comprises plastic film.

10. A thermal insulating mat as defined by claim 1, characterized in that the chamber has a volume of 1 $cm^3$ maximum.

* * * * *